A. E. KENNEDY.
PICTURE.
APPLICATION FILED MAR. 16, 1909.
959,754. Patented May 31, 1910.
2 SHEETS—SHEET 1.

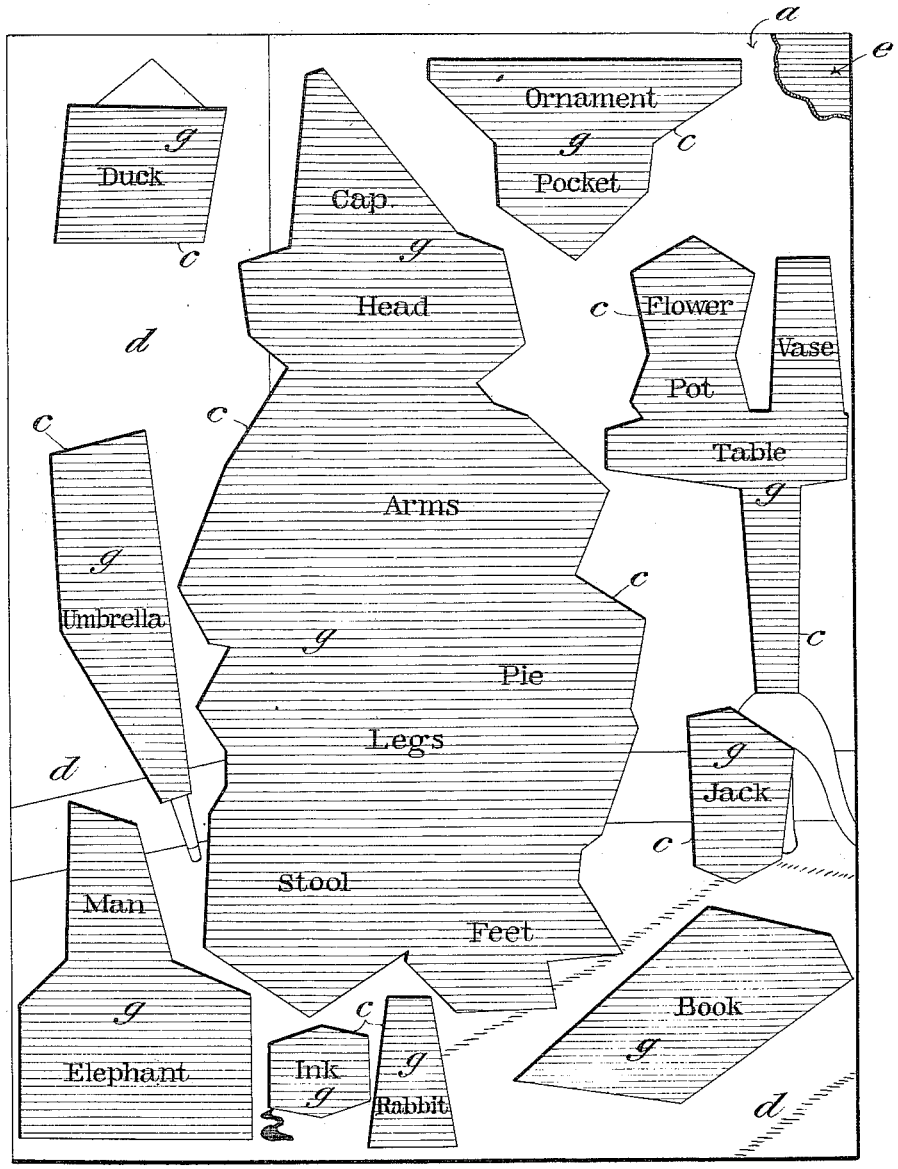

UNITED STATES PATENT OFFICE.

ALBERT ERNEST KENNEDY, OF LEYTON, ENGLAND.

PICTURE.

959,754.  Specification of Letters Patent.  Patented May 31, 1910.

Application filed March 16, 1909. Serial No. 483,772.

*To all whom it may concern:*

Be it known that I, ALBERT ERNEST KENNEDY, a subject of the King of Great Britain, residing at 4 Abbott's Park road, Leyton, in the county of Essex, England, and Kingdom of Great Britain, have invented new and useful Improvements Relating to Pictures, Illustrations, and the Like, of which the following is a specification.

This invention relates to pictures, illustrations, maps, plans and the like and has mainly for its object to enable them to be used for educational purposes in a novel and interesting manner and also for amusement if desired.

According to the invention portions of a picture, illustration, map, plan or the like representing different objects are made detachable and may or may not have information relative to such objects imprinted on the backs of the said portions or on a suitable backing for the picture or on both the portions and the backing.

A suitable arrangement for carrying out the invention is as follows:—The required picture or the like is mounted or made upon a sheet of cardboard or other suitable material which is cut through at the outlines of the various objects depicted thereon so as to be removable therefrom, the ground or remainder of the picture being mounted upon a suitable backing of cardboard or other material. Information relative to the objects is imprinted as above set forth.

In order that the invention can be clearly understood reference is had to the annexed drawing, in which—

Figure 1 is a view of a picture or illustration arranged and constructed according to the invention. Fig. 2 is a section on the line 2—2 of Fig. 1. Fig. 3 is a view of the picture with the detachable sections removed and showing imprinted matter on the then exposed face of the backing.

$a$ is the sheet of cardboard or the like upon which the picture or illustration is mounted or made and $b, b$ are the various objects depicted in the picture. The material $a$ is cut through as indicated by the lines $c, c$ at the outlines or thereabout of the objects $b, b$ so that the portions or sections $b^1$ of the material on which the said objects are depicted can be removed from the facing or ground $d$ of the picture.

$e$ is the backing of cardboard or other material on which the said ground is mounted. In Fig. 3 a portion of one corner of the facing is broken away to show the concealed part of the backing $e$.

Information relative to the objects $b, b$ can be imprinted on the backs $f, f$ of the pieces of material on which such objects are depicted, or on the part $g$ of the backing $e$ disclosed when the said pieces are removed. Or such information may be imprinted on both the said backs $f, f$ and the parts $g, g$ of the backing $e$.

The face $d$ of card board constituting the ground of the picture is thus furnished with apertures cut therethrough along the lines $c, c$ and the backing $e$ of card board is secured to the rear of said facing and covers said apertures at the rear and has imprinted matter (as shown in Fig. 3) on the exposed portions $g$ of its front face within the boundaries of said apertures. The detachable sections $b, b$ fit said apertures, seat on said backing and have pictorial representations corresponding to the imprinted matter on the exposed portions $g, g,$ of the backing with which they respectively register.

By the described arrangement it will be seen that after inspecting the objects the information relative thereto can be obtained by removing them from the picture or the like. The picture, illustration or the like also serves as a toy or puzzle, the object being to return the parts to their places after removal or build up the picture, the information relative to the objects, as above described, enabling them to be placed in their proper positions, notwithstanding they may have been mixed indiscriminately.

Although the invention has been described in connection with a picture or illustration it will be understood that a map, plan or the like may also be used, certain parts of which are rendered removable in the manner above described; and in the claims the term "picture" is intended to include a map, plan or similar illustration.

I claim—

1. A picture having, in combination, a facing of card board constituting the ground of the picture and having apertures cut therethrough; a backing of card board secured to said facing and covering said apertures at the rear, said backing having imprinted matter on its front face within the boundaries of said apertures; and detachable sections fitting said apertures and seating on said backing, said sections having pictorial representations corresponding to the imprinted matter on the backing with which they respectively register.

2. A picture having, in combination, a facing constituting the ground of the picture and having apertures cut therethrough; a backing secured to said facing and covering said apertures at the rear, said backing having imprinted matter on its front face within the boundaries of said apertures; and detachable sections fitting said apertures and seating on said backing, said sections having pictorial representations corresponding to the imprinted matter on the backing with which they respectively register.

3. A picture having, in combination, a backing having imprinted matter on its front face; and detachable sections having pictorial representations corresponding to the imprinted matter on the backing with which they respectively register.

ALBERT ERNEST KENNEDY.

Witnesses:
H. D. JAMESON,
F. L. RAND.